United States Patent Office 3,600,341
Patented Aug. 17, 1971

3,600,341
ABLATIVE CHAR-FORMING COMPOSITIONS CONTAINING AN INTRACTABLE POLYPHENYLENE POLYMER
Donald L. Schmidt and Paul F. Pirrung, Dayton, Ohio, assignors to the United States of America as represented by the Secretary of the Air Force
No Drawing. Filed Nov. 8, 1966, Ser. No. 593,244
Int. Cl. C08g 37/16, 51/08, 51/10
U.S. Cl. 260—13
14 Claims

ABSTRACT OF THE DISCLOSURE

This invention contemplates novel plastic compositions, filled plastic composites, and coating materials wherein the said plastic composition is composed of an intimate mixture of intrictable polyphenylene polymer and a crosslinkable thermosetting polymer. The invention further contemplates new high temperature, thermal shielding and thermal control uses for the polyphenylene modified polymers and composites, which are made possible by the superior char forming characteristics of the resinous matrix.

The invention described herein may be manufactured and used by or for the United States Government for governmental purposes without payment to us of any royalty thereon.

This invention relates to ablative thermal shielding materials, specifically polymer containing composite materials with properties and characteristics rendering them suitable for use on external surfaces of hypersonic atmospheric vehicles like high Mach number aircraft, lifting aerospace vehicles, entry nose cones and satellites, in rocket nozzles and engines including those portions exposed to hot combustion products and heat from propellants of the solid, liquid and hybrid types, and on ground equipment exposed to transient high temperatures or high incident heating rates.

Polymer containing composite materials have unique properties or a balance of properties which lend themselves to very high temperature and ablative applications. These materials are generally characterized as relatively light in weight, high strength, thermally stable, insulative, microwave transparent, thermally nonconductive, chemically inert, fatigue resistant, vibration dampening, heat and energy absorbing, erosion resistant, electrically nonconductive, non-shattering, easy to fabricate, low in cost, non-brittle, and possessing other desirable features. The prior art has created several classes of ablative polymer containing composites which have provided satisfactory service at elevated temperature conditions. Material performance is known to depend upon the specific composition, construction, and manufacturing process employed in producing the ablative material, and the detailed environmental factors which may be encountered such as temperature, heating rate and variation with exposure time, total heat load, mode of heating, gas enthalpy, period of heating, nature of the flow conditions, implied pressure, gasdynamic shear stress, particle impact, gas reactivity, and the like. One class of polymeric materials which have consistently yielded good ablative heat shielding characteristics are the char forming polymers of the aromatic and heterocyclic types, like phenol formaldehyde (phenolic), epoxy novolac, resorcinol formaldehyde, melamine formaldehyde, phenol furfuraldehyde, phenyl silane, polybenzimidazole, polyimide, and similar materials. During exposure to relatively high temperatures on the order of 600° F. and higher, these polymers degrade to gaseous products and a carbonaceous surface residue. The weight percent of char obtained from the original polymer varies with its initial chemical composition and structure. More specifically, the char yields obtained on thoroughly pyrolyzed polymeric resins are: polyphenylene, 82 percent; polybenzimidazole, 79 percent; polyimide, 58 percent; polythiazole, 58 percent; phenolic, 40 percent; and epoxy novolac, 30 percent. The carbonaceous char formed on the exposed surface of the polymer serves to reduce the rate of degradation by the combined effects of several self regulating processes. Firstly, the surface char layer provides for a steep temperature gradient from the exposed surface to the underlying intact polymer and thereby isolates the polymer from the high temperature environment. A secondary effect of the surface char is to acquire a high surface temperature (up to about 6,200° F. and higher) depending upon the incident heating rate, and thereby reduce the hot-wall heating to the exposed surface. A third effect of the newly formed char layer is to interact with the ablative gases as they percolate through the char layer from the underlying substrate region to the surface. In the process, the gases are decomposed to lower molecular weight products with the absorption of heat and the newly formed gaseous products block a greater percentage of the incident heat by the well known transpiration cooling process. In spite of these desirable attributes, the performance of ablative char-forming polymers is limited by the total percentage of char formed, its microstructure, structural properties, compatibility with other components used in composites such as fibers, and possibly other factors. Oxidizing environments tend to remove the solid chart in the form of gaseous carbon monoxide and carbon dioxide. Environmental induced mechanical forces involving high gasdynamic shear stresses, external pressure, impact from particles or droplets, and high internal pressures in the char substrate tend to significantly erode and degrade the ablative performance of the char. Continual and complete removal of the carbonaceous surface material during high temperature exposure has been shown to reduce the ablative efficiency by as much as 90 percent, as compared to the same material which retained the char layer throughout exposure to hyperenvironmental temperatures. Thus, although char forming polymers have demonstrated substantial high temperature and ablative capabilities in certain particulars and would normally suggest themselves for aeronautical and astronautical applications because of their heat shielding characteristics, their char forming efficiency and char structural properties have prevented their successful use in many applications which are vital to aerospace and military technologies.

Although many attempts have been made in the past to provide polymers with improved char yields and characteristics, none have as yet been completely successful in providing the degree of thermal protection required by modern day aerospace and propulsion technologies. The most promising high char yielding polymers prepared to date are of the polyphenylene family. These polymers are composed essentially of carbon and hydrogen in aromatic rings, with the rings chemically linked to each other through the ortho, meta or para position. Such polymers are to be clearly distinguished from other chemically similar phenylene type materials, such as polyphenylene oxide, diphenyl oxide, polyphenylene sulfone, and other polymers containing the designation "phenylene."

Polyphenylene polymers prepared to date are broadly classified as being of the intractable or fusible type. Intractable polyphenylenes have been synthesized by a variety of procedures including the Wurtz-Fittig reaction of para-dichloro-benzene in the presence of sodium or a sodium-potassium alloy, by reacting mono-Grignard reagent of dibromoarenes with cobaltous chloride, polymerization of 1,3-cyclohexadiene with Ziegler-Natta catalysts followed by halogenation and dehydrohalogenation, cationic oxidative polymerization of benzene or higher molecular weight aromatics in the presence of a Lewis acid catalyst, water and various oxidizing agents, and the electrolysis of benzene or other aromatics in the presence of a suitable catalyst. Major reaction products of these syntheses are usually para-polyphenylene polymer or a polyphenylene polymer having a molecular weight of 4,000 or higher with irregular or randomly arranged ortho, meta and para linkages within the polymer chain, all of which are herein defined as intractable polyphenylene. The resultant polyphenylene polymer is relatively stable in 1000° C. nitrogen, exhibits good thermal stability in 900° F. oxidizing air, yields up to 82 percent elemental carbon during pyrolysis, possesses desirable crystalline microstructural features, exhibits high chemical inertness, releases low molecular weight hydrogen and other gases during thermal degradation, and other wanted features. Unfortunately, these polyphenylene polymers lack a defined melting point, are sparingly soluble in a few solvents and are relatively intractable. All of these prior art resins are completely unsuitable for use in preparing fiber reinforced plastic composites by molding or laminating, or preparing protective coatings by brushing or similar techniques. Such intractable polyphenylene resins were found to be unsuitable because they were of relatively low molecular weights or had a relatively low and poorly defined softening point and hence relatively poor characteristics. Some of these polyphenylene polymers have been found to be slightly fusible because of the undesired presence of aliphatic groups like alkyl groups or olefinic groups. The lower thermal stability of these polymers, however, have made them of little interest. The more thermally stable polyphenylene resins were found to be essentially infusible and insoluble, lacked suitable curing agents, and would not flow or assume the shape of molds in order to prepare plastic composites and coatings. Billets and composites of these intractable polyphenylenes have been made with great difficulty, however, using very high pressures like 5,000 pounds per square inch or higher and high sintering temperatures on the order of 900° F. Such molded resinous and composite articles exhibit poor mechanical properties and low ablative thermal protective efficiency. The aforementioned undesirable features have thus eliminated the use of intractable polyphenylene in previous ablative heat shields and high temperature coatings.

Soluble or fusible types of polyphenylene resins, which are soluble in trichlorobenzene or certain hot aromatic solvents, have also been prepared by cationic oxidative polymerization of ortho-terphenyl, meta-terphenyl, biphenyl, 1,3,5-triphenylbenzene, and mixtures of these monomers. A portion of the resultant polymers formed by these reactions are of the intractable type, and are fractionated by solvent extraction techniques. Such intractable polyphenylene materials, like those prepared by the aforementioned processes, have not found any utility and are regarded as unwanted reaction products.

Quite unexpectedly, we have found that intractable polyphenylene resins can be mixed with other char-forming resins contained in a liquid solvent carrier, or processed with B-staged char-forming resins to yield improved charring resin matrices. These superior char forming resinous matrices, when combined with other reinforcing agents and fillers, exhibit outstanding ablative thermal efficiency because of the improved char yield properties and characteristics obtained from intractable polyphenylene modified resins.

It is accordingly an object of the invention to provide a new use for the previously unwanted intractable polyphenylene resins by incorporating them along with a binding resin into an ablative composite.

Another object of the invention is to provide ablative plastic composites with superior charring characteristics, which will render them suitable for use in highly eroding environments associated with hypersonic atmospheric flight and rocket propulsion.

Still another object of this invention is to provide a fabric or cloth reinforcement of suitable composition which contains a polyphenylene modified resin suitably polymerized to a B-stage.

Still another object of the invention is to provide a high temperature resinous coating material, which has superior thermal stability and insulating characteristics.

These and still further objects and advantages of the present invention will become readily apparent from a reading of the following detailed description and specific examples.

Broadly, the present invention contemplates novel ablative composites containing a polymeric bonding matrix which is composed of commercially available resinous materials in conjunction with intractable, high char-yielding polyphenylene resin in the amount of 2 to 40 weight percent, reinforcing agents like fibrous silica, glass, quartz, zirconia, graphite and carbon for structural reinforcement of the polymer, and particulate materials or a powdered ceramic filler like silica glass, quartz, zirconia, carbon and graphite as required to improve molding and ablative characteristics. Other fibrous re-enforcing agents which are useable in the present invention include woven fabrics selected from the group consisting of graphite, glass, asbestos, quartz, zirconia, boron nitride, polybenzimidazole, viscose rayon and aromatic polyimide. The fibrous re-enforcing agent can be present in the amount of 5 to 75 weight percent, the remainder being the resin material. The resin matrix can comprise 25 to 40 weight percent, and the remainder is powdered ceramic filler. Useful ablative composites can be prepared from the preceding component materials when the ingredients thereof are formulated and thoroughly blended in the required amounts, molded or cast and then cured at pressures and temperatures adequate to fully polymerize and fuse the polymeric mass, and finally postcured at the requisite temperatures and pressures to develop optimum properties.

Having described the fundamental aspects of the present invention, the following examples are given to illustrate embodiments thereof.

EXAMPLE 1

Preparation of an intractable polyphenylene modified phenolic resin reinforced with carbon cloth was conducted in accordance with the following method. Intractable polyphenylene resin was first prepared by one of the aforementioned processes, and then ground to a very fine particle size with a mortar and pestle and while immersed in liquid nitrogen gas to dissipate heat and prevent clumping of the particles. The liquid nitrogen was then permitted to evaporate from the container, and the polyphenylene resin removed and dried. The resin powder was then slowly added with stirring to a liquid phenolic resin (60 percent solids, 91LD, from the American Reinforced Plastics Co., Los Angeles, Calif.) until the final mixture contained 33 parts by weight of intractable polyphenylene resin. No settling of the polyphenylene resin was noted upon standing which insured proper mixing. The viscosity of the resin mixture was then reduced by adding acetone with stirring, with the final mixture containing about 12 parts by weight of acetone. Satin woven carbon cloth (CCA–1, H. I. Thompson Fiber Glass Co., Gardena, Calif.) was oven dried for two hours at 250° F. and then slowly immersed in the liquid resin bath for a period of time necessary to thoroughly impregnate the fabric and obtain the desired final resin content. The wet prepreg material was then brought through opposing rubber rollers under pressure to effectively spread the wet resin over the fabric surfaces and remove the entrapped air. The wet prepreg was then air dried at room temperature for two hours, dried at 160° F. for five minutes to volatilize most of the solvent, and finally heated to 240° F. for three minutes in a circulating air oven to obtain the proper degree of resin cure. The prepreg fabric was then cut to a predetermined size and stacked in a preheated 300° F. mold. Each ply of prepreg material was turned back to back to facilitate nesting or better packing and thus higher density composites. The material was subjected to a contact pressure of 1,000 pounds per square inch (p.s.i.) and a temperature of 325° F. for two hours. The elevated temperature and pressure conditions were then slowly reduced to ambient conditions, and the molded composite transferred to an oven. The composite was then post-cured in a helium gas atmosphere for ten hours at 275° F., 20 hours at constantly increasing temperatures from 275° F. to 400° F., 4 hours at 400° F., cooled to 200° F. over a period of seven hours, and then removed from the oven. The newly formed composite contained 45 weight percent of resin material of which 15 weight percent was intractable polyphenylene resin and 30 weight percent was phenolic resin. The composite was essentially void-free, had a density of 84 pounds per cubic foot, and a Barcol hardness of 68.

To confirm the superior charring characteristics and erosion resistance of the polyphenylene modified phenolic composite, the material was subjected to high temperature subsonic air having a nominal enthalpy of 8,000 B.t.u. per pound, and for a period of 30 seconds. The nominal calorimetric surface heating rate was 1,000 B.t.u. per square foot per second, and the total heat load was 30,000 B.t.u. per square foot. Under these test conditions, the polyphenylene modified phenolic composite had a linear ablation (erosion) rate of 0.0035 inch per second while an unmodified, commercially available, state-of-the-art phenolic resin composite had a linear ablation rate of 0.0068 inch per second. The polyphenylene modified phenolic thus provided nearly twice the dimensional stability in high temperature air as compared to a reference unmodified phenolic resin. The rate of heat transfer into the polyphenylene modified phenolic composite was found to be one-half that of an unmodified phenolic composite, thus attesting to its superior thermal insulative ability.

EXAMPLE 2

Fabrication of an intractable polyphenylene modified phenolic resin reinforced with silica fabric was accomplished according to the following procedure.

Finely divided para-polyphenylene resin was added to liquid phenolic resin (91LD, 60 percent solids, American Reinforced Plastics Co.) until the final mixture contained five parts by weight of phenolic resin to one part by weight of para-polyphenylene. Silica fabric (Refrasil C-100-48, H. I. Thompson Fiber Glass Co.) was then prepregged with the resin mixture and processed using standard commercial practices as described in Example 1. The prepregged silica fabric was then cut to size, plies stacked in the mold, and subjected to 900 pounds per square inch pressure for two minutes. The mold was then heated to a maximum temperature of 300° F. and held at temperature for 30 minutes. The composite was postcured at the conditions enumerated in Example 1, and removed from the oven. The resultant composite contained 36 weight percent of resinous matrix of which six weight percent was para-polyphenylene resin and 30 weight percent was phenolic resin. The composite was void-free, had a density of 106 pounds per cubic foot, and a Barcol hardness value of 48.

The outstanding char yield and ablative characteristics of the polypheinylene modified phenolic resin-silica fabric reinforced composite was obtained in high temperature air. Testing conditions were identical to those described in Example 1. The para-polyphenylene modified phenolic composite had a linear ablation rate slightly lower than the unmodified phenolic composite. The polyphenylene modified phenolic composite was found to possess superior thermal insulative characteristic, as compared to a similar unmodified phenolic resin composite. For composite specimens containing equal resin contents and silica reinforcement contents, the polyphenylene modified phenolic composite took 30 seconds to reach a backwall temperature of 200° F., as compared to 21 seconds to reach an identical backwall temperature for this unmodified phenolic composite. The polyphenylene modified phenolic composite also possessed a higher ablative surface temperature, which was due to a greater amount of particulate pyrolyzed polymer carbon in the molten silica surface layer.

EXAMPLE 3

Preparation of an intractable polyphenylene modified fusible polyphenylene resin reinforced with carbon cloth was accomplished according to the following procedure. One part by weight of intractable powdered parapolyphenylene was added to two parts by weight of powdered fusible polyphenylene (1,000 to 1,500 molecular weight resin, Abchar 413, Hughes Aircraft Co., Culver City, Calif.) and thoroughly mixed for 15 minutes in a high speed blender. The blended dry resins were then slowly added to chloroform, which functioned as a liquid carrier. Carbon fabric (CCA-1, H. I. Thompson Fiber Glass Co.) was slowly passed through the resin mixture and then air dried for 30 minutes to evaporate the solvent carrier. This process was repeated three successive times to obtain the necessary resin content on the fabric. The resin coated fabric was then suspended in an air oven and slowly heated to 160° F. to volatilize most of the remaining aromatic liquid carrier and to advance the resin to a suitable state of partial cure. The prepreg was then cut to size, stacked in a preform mold, and subjected to 200 pounds per square inch pressure. The mold was then slowly heated to 175° F. for 15 minutes. Having liberated additional volatiles, the molding pressure was increased to 3,500 pounds per square inch and the temperature raised to 400° F. and held at temperature for 120 minutes. While under pressure, the mold temperature was dropped to 150° F. over 30 minutes. The pressure was then released and the part removed from the mold. The cured laminate was then post cured in an argon atmosphere for 18 hours at 275° F., 108 hours at temperatures from 275° F. to 550° F., 6 hours at 550° F., and finally cooled to room temperature.

The post cured part contained 45 weight percent of the polyphenylene resins and 55 weight percent of carbon fabric. Density of the laminate was 80 pounds per cubic foot and its Barcol hardness was 30.

While the foregoing invention has been described in detail in connection with certain preferred and specific embodiments thereof in order to carry out the invention, to distinguish it from previous inventions, and to set it apart from that which has been previously described in the literature, it is to be understood that the particulars herein have been for the purposes of illustration only and do not limit the scope of the invention as it is more precisely defined in the subjoined claims.

We claim:

1. A hard rigid ablative thermal shielding resin matrix formed by the application of heat and pressure comprising a powdered, intractable polyphenylene polymer characterized by (a) a poorly defined melting point, (b) insolubility, (c) unsuitability for molding, and (d) a lack of suitable curing agents; and a binding resin selected from the group consisting of a phenol formaldehyde polymer and a fusible polyphenylene; said intractable polyphenylene polymer being present in the amount of 2 to 40 weight percent.

2. A composition of claim 1 wherein said binding resin is phenol formaldehyde polymer.

3. A composition of claim 1 wherein said binding resin is fusible polyphenylene.

4. A plastic molding composition composed of a resin matrix according to claim 1 and a powdered ceramic filler selected from the group consisting of glass, silica, quartz, zirconia, carbon and graphite.

5. A composition of claim 4 wherein said plastic molding composition is composed of from two to twenty weight percent of powdered ceramic filler.

6. A plastic molding composition composed of the resin matrix according to claim 1, and a fibrous reinforcing agent selected from the group consisting of glass, asbestos, quartz, zirconia, boron nitride, carbon, silica, graphite, polybenzimidazole, viscose rayon and aromatic polyimide.

7. A composition of claim 6 wherein said fibrous reinforcing agent is woven carbon fabric.

8. A composition of claim 6 wherein said fibrous reinforcing agent is woven silica fabric.

9. A composition of claim 6 wherein said fibrous reinforcing agent is woven graphite fabric.

10. A composition of claim 6 wherein said fibrous reinforcing agent is composed of woven fabric selected from the group that consists of glass, asbestos, quartz, zirconia, and boron nitride.

11. A composition of claim 6 wherein said fibrous reinforcing agent is composed of woven fabric selected from the group that consists of polybenzimidazole, viscose rayon and aromatic polyimide.

12. A composition of claim 6 wherein said fibrous reinforcing agent comprises from five to seventy five weight percent of the total composition.

13. A composition comprising the resin matrix of claim 1 plus a powdered ceramic filler selected from the group consisting of glass, silica, quartz, zirconia, carbon and graphite, wherein said resin matrix comprises from twenty-five to forty weight percent of the composition and the remainder of the composition is composed of powdered ceramic filler.

14. The composition of claim 7 wherein the binding resin is fusible polyphenylene, the intractable polyphenylene polymer is present in the ratio of one part by weight or two parts by weight of the binding resin, and the combined polyphenyl resins constitute 45 weight percent of the composition, and the carbon fabric constitutes the remaining 55 weight percent.

References Cited
UNITED STATES PATENTS

| | | | |
|---|---|---|---|
| 3,082,177 | 3/1963 | Anderson | 260—2H |
| 3,320,183 | 5/1967 | Brown | 260—2H |
| 3,331,885 | 7/1967 | Rider et al. | 260—38 |

OTHER REFERENCES

Materials in Design Engineering, vol. 54, No. 7, p. 97, December 1961.

ALLAN LIEBERMAN, Primary Examiner

U.S. Cl. X.R.

260—14, 7R, 37SB, 37EP, 37N, 38, 39R, 39SB, 823, 824R, 830R, 838, 849, 857R; 117—123D, 161C, 161L, 161LN, 161UA, 161ZA, 161ZB